US011920311B2

(12) United States Patent
Jacobs et al.

(10) Patent No.: US 11,920,311 B2
(45) Date of Patent: Mar. 5, 2024

(54) MOBILE WATERJET RAIL REPAIR SYSTEM

(71) Applicant: Hypertherm, Inc., Hanover, NH (US)

(72) Inventors: Joep Jacobs, PB Breda (NL); Johannes Petrus Bernardus Wildhagen, Molenschot (NL)

(73) Assignee: RailRestore BV, Bavel (NL)

( * ) Notice: Subject to any disclaimer, the term of this patent is extended or adjusted under 35 U.S.C. 154(b) by 0 days.

(21) Appl. No.: 17/450,649

(22) Filed: Oct. 12, 2021

(65) Prior Publication Data

US 2022/0025596 A1 Jan. 27, 2022

Related U.S. Application Data

(62) Division of application No. 16/572,799, filed on Sep. 17, 2019, now Pat. No. 11,174,609.

(60) Provisional application No. 62/732,175, filed on Sep. 17, 2018.

(51) Int. Cl.

*E01H 8/10* (2006.01)
*B08B 3/02* (2006.01)
*E01H 8/12* (2006.01)

(52) U.S. Cl.

CPC ............ *E01H 8/125* (2013.01); *B08B 3/024* (2013.01)

(58) Field of Classification Search

None

See application file for complete search history.

(56) References Cited

U.S. PATENT DOCUMENTS

| | | | |
|---|---|---|---|
| 3,858,358 | A | 1/1975 | Stachowiak et al. |
| 6,148,732 | A | 11/2000 | Conway et al. |
| 2010/0180738 | A1 | 7/2010 | Tavger |

FOREIGN PATENT DOCUMENTS

| | | | |
|---|---|---|---|
| FR | 2570105 | | 3/1986 |
| JP | S61290190 | A | 12/1986 |
| JP | 03100210 | A | 4/1991 |
| JP | H0670859 | | 10/1994 |
| JP | 07024737 | A | 1/1995 |
| JP | 08189018 | A | 7/1996 |

(Continued)

OTHER PUBLICATIONS

WOMA Karcher Group, High-Pressure Pumps, Units, Water Jetting Tools | WOMA GmbH, www.woma.de, printed Sep. 11, 2019; 3 pages.

(Continued)

*Primary Examiner* — Eric W Golightly

(74) *Attorney, Agent, or Firm* — Cesari and McKenna, LLP

(57) ABSTRACT

A method of operating an ultra-high pressure liquid jet system includes positioning, relative to a rail, a translatable frame having a liquid jet processing head fluidly connected to an ultra-high pressure liquid pump. The method also includes providing, to the liquid jet processing head, via the ultra-high pressure liquid pump, a pressurized fluid forming a liquid jet that contacts the rail such that the pressurized fluid is at least 20,000 PSI during a rail cutting operation or a re-profiling operation. Steps of the method include providing an abrasive feed system coupled to the liquid jet processing head to provide an abrasive to the liquid jet and translating the liquid jet processing head relative to the rail, thereby performing a processing operation on a linear length of the rail along a direction of translation of the rail.

12 Claims, 12 Drawing Sheets

(56) References Cited

FOREIGN PATENT DOCUMENTS

| | | |
|---|---|---|
| RU | 2348786 C2 | 3/2009 |

OTHER PUBLICATIONS

Keolis, MBTA tap special equipment to manage slippery-rail season, https://www.metro-magazine.com/security-and 2, afety/news/725576/keolis-mbta-tap-special-equipment-to-manage-slippery-rail-season, Metro Magazine, Sep. 8, 2017; 4 pages.
Tunnel Washer, https:/lwww.masstransitmag.com/rail/maintenance/railroad-right--of-way-and-maintenance-of-way-~quipmenl/producl/10067452/harsco-rail-tunnel-washer, Mass Transit, Aug. 16, 2007; 2 pages.
Saeed, Khurram, Metro-North, NJ Transit combat slippery rail, https://www.lohud.com/story/news/transil/2015/10/12retro-north-nj-transit-clear-fallen-leaves-combat-slippery-rail/73812872/, Oct. 12, 2015; 2 pages.
Cassidy, Martin B., Leaves foul morning rail commute, https://www.stamfordadvocate.com/news/article/Leaves-foulmorning-rail-commute-4033077.php, Nov. 13, 2012; 3 pages.
JPH0670859U—Google Patents translation, retrieved Nov. 20, 2020 (Year: 2020).
International Search Report and the Written Opinion of the International Search Report for PCT/US2019/051385 dated Jan. 13, 2020, 25 pages.
Microfilm of Japanese Utility Model Application No. 60-165682, received Aug. 15, 2023, 1 page.
Japanese Laid-Open Utility Model Publication No. 62-075000, received Aug. 15, 2023, 11 pages, not in English.

MOBILE WATERJET RAIL REPAIR SYSTEM

CROSS REFERENCE TO RELATED APPLICATION

This application is a Divisional of U.S. patent application Ser. No. 16/572,799, filed on Sep. 17, 2019 and issued as U.S. Pat. No. 11,174,609 on Nov. 16, 2021, which claims benefit of U.S. Provisional Patent Application No. 62/732,175, filed on Sep. 17, 2018 and entitled "Mobile Waterjet Rail Repair System." The contents of these applications are incorporated herein by reference in their entireties.

FIELD OF THE INVENTION

The invention relates generally to the field of liquid pressurization systems and processes. More specifically, the invention relates to methods and apparatuses for restoring and cleaning rails using pressurized liquid jets.

BACKGROUND

Liquid pressurization systems produce high pressure (e.g., 20,000 to 90,000 pounds per square inch (PSI)) streams of liquid for various applications. For example, high pressure liquid may be delivered to a liquid jet cutting head, a cleaning tool, a pressure vessel or an isostatic press. In the case of liquid jet cutting systems, liquid is forced through a small orifice at high velocity to concentrate a large amount of energy on a small area. To cut hard materials, a liquid jet can be "abrasive" or include abrasive particles for increasing cutting ability. As used herein, the term "liquid jet" includes any substantially pure water jet, liquid jet, and/or slurry jet. However, one of ordinary skill in the art would easily appreciate that the invention can apply to other systems that use liquid pumps or similar technology.

Railways are an important mode of transportation throughout the world. However, prolonged usage and heavy loads can cause rails to deform and wear over time. Damaged rails create bumpy rides, stresses on train car wheels contacting the rails, and other damage, and replacing damaged railroad tracks can be very expensive. One known method to repair railroad tracks is to use large grinding trains to machine the tracks, but this method is loud, unpleasant and expensive, particularly when applied to damaged areas. The sound and resulting sparks are so offensive that these trains are often referred to as "hell trains."Moreover, this grinding technique is not effective around corners or at junctions. What is needed is an improved method to treat (e.g., repair, reshape and restore) existing railroad tracks.

SUMMARY OF THE INVENTION

The present invention includes a new mobile liquid jet system that uses one or more pressurized liquid streams to treat damaged, worn or dirty railway rails. The system can include a mobile platform (e.g., a truck, a train, a rail car or cars, or other rail-going systems) that supports a waterjet system capable of operating on the move (e.g., as it travels down the very tracks it is treating) while machining the rails via one or more pressurized liquid jets. The system can include a robot or other motion system, which can be placed over or adjacent to the rail being serviced, but does not necessarily have to be attached to the serviced rail. In some embodiments the invention may include a portable truck mounted unit (see, e.g., FIG. 1A) that may have one set of tires for driving along the road and another set of deployable railway wheels so that the vehicle may drive along and/or on the railroad track.

In one aspect, the invention features a translatable, ultra-high pressure liquid jet system. The liquid jet system includes a translatable frame configured to maintain mechanical contact with a rail. The liquid jet system also includes a liquid jet processing head affixed to the frame and configured to maintain a distance from the rail and/or provide a liquid jet that contacts the rail. The liquid jet system also includes an ultra-high pressure liquid pump in fluid communication with the liquid jet processing head. The ultra-high pressure liquid pump is configured to supply pressurized liquid to the liquid jet processing head.

In some embodiments, the frame is attached to one or more wheels configured to contact the rail. In some embodiments, the system is configured to translate along the rail via the one or more wheels during a rail processing operation. In some embodiments, the ultra-high pressure liquid pump is disposed on the frame. In some embodiments, the ultra-high pressure liquid pump is disposed on a unit separate from the frame and is capable of moving independently of, and at a different speed than, the frame. In some embodiments, the system is configured to remove an exterior portion of the rail having a linear dimension between 0.01 mm and 0.1 mm. In some embodiments, the system is configured to remove an exterior portion of the rail having a linear dimension between 0.1 mm and 1.0 mm. In some embodiments, the system is configured to remove an exterior portion of the rail having a linear dimension between 1.0 mm and 5.0 mm.

In some embodiments, the liquid jet processing head is configured to provide the liquid jet to the rail at an angle relative to a ground plane. In some embodiments, the system further includes second and third liquid jet processing heads in fluid communication with the ultra-high pressure liquid pump and configured to provide second and third liquid jets, respectively, to the rail at second and third angles, respectively, relative to the ground plane. In some embodiments, the system further includes fourth, fifth and sixth liquid jet processing heads in fluid communication with the ultra-high pressure liquid pump and configured to provide fourth, fifth and sixth liquid jets, respectively, to a second rail opposite the first rail at fourth, fifth and sixth angles, respectively, relative to the ground plane.

In some embodiments, the liquid jet processing head is affixed to a positioning system attached to the frame. The positioning system is configured to adjustably position the liquid jet processing head with respect to the rail. In some embodiments, the positioning system includes at least one of a gantry or a robotic arm attached to the frame and is moveable independently of the frame. In some embodiments, a second frame is configured to engage the rail. The second frame is moveable relative to the frame during operation of the ultra-high pressure liquid jet system. In some embodiments, the second frame includes a liquid reservoir fluidly connected to the ultra-high pressure liquid pump. In some embodiments, the liquid reservoir has a capacity of at least 1,000 liters.

In some embodiments, a generator is disposed on the second frame and operably connected to the ultra-high pressure liquid pump. In some embodiments, the liquid jet processing head is configured to process the rail while the second frame translates along the rail. In some embodiments, the system includes a nozzle fluidly connected to the liquid jet processing head. In some embodiments, the liquid jet system includes an abrasive feed system fluidly connected to the liquid jet processing head and configured to introduce a flow of abrasive into the liquid jet. In some embodiments, the ultra-high pressure liquid pump is configured to generate a liquid jet of at least 20,000 PSI for a rail cutting operation or a re-profiling operation, or optionally a higher threshold, e.g., 30,000 PSI, 40,000 PSI, 50,000 PSI, 60,000 PSI, 70,000 PSI, 80,000 PSI, 90,000 PSI, or 100,000 PSI. In some embodiments, the ultra-high pressure liquid pump is configured to generate a liquid jet of between 200 to 2,000 PSI for a rail cleaning operation or a surface treatment operation (e.g., is also capable of a low-pressure application).

In another aspect, the invention features a method of operating an ultra-high pressure liquid jet system. The method includes positioning, relative to a rail, a translatable frame having a liquid jet processing head fluidly connected to an ultra-high pressure liquid pump. The method also includes providing, to the liquid jet processing head, via the ultra-high pressure liquid pump, a pressurized fluid forming a liquid jet that contacts the rail. The method also includes translating the liquid jet processing head relative to the rail, thereby performing a processing operation on a linear length of the rail along a direction of translation of the rail.

In some embodiments, the frame includes one or more wheels configured to engage the rail. In some embodiments, a movement of the ultra-high pressure liquid pump corresponds to translation of the frame. In some embodiments, the ultra-high pressure liquid pump is fixedly connected to the frame. In some embodiments, the ultra-high pressure liquid pump is disposed on a unit separate from the frame and is capable of moving at a different speed than the frame. In some embodiments, the liquid jet processing head is configured to provide the liquid jet to the rail at an angle relative to a ground plane. In some embodiments, the pressurized fluid is at least 20,000 PSI during a rail cutting operation or a re-profiling operation, or optionally a higher threshold, e.g., 30,000 PSI, 40,000 PSI, 50,000 PSI, 60,000 PSI, 70,000 PSI, 80,000 PSI, 90,000 PSI, or 100,000 PSI. In some embodiments, the pressurized fluid is between 200 to 2,000 PSI during a rail cleaning operation or a surface treatment operation. In some embodiments, the ultra-high pressure liquid pump is included in a second frame moveable independently of the first frame during operation of the liquid jet system. In some embodiments, the method further includes translating the second frame at a different speed than the frame during operation of the liquid jet system.

In some embodiments, the liquid jet processing head is configured to provide the liquid jet to the rail at an angle relative to a ground plane. In some embodiments, the frame further includes second and third liquid jet processing heads fluidly connected to the ultra-high pressure liquid pump. In some embodiments, the method further includes providing, to the second and third liquid jet processing heads, via the ultra-high pressure liquid pump, pressurized fluid forming second and third liquid jets, respectively, that contact the rail at second and third angles, respectively, relative to the ground plane. In some embodiments, the ultra-high pressure liquid jet system includes fourth, fifth and sixth liquid jet processing heads in fluid communication with the ultra-high pressure liquid pump. In some embodiments, the method further includes providing, to the fourth, fifth and sixth liquid jet processing heads, via the ultra-high pressure liquid pump, pressurized fluid forming fourth, fifth and sixth liquid jets, respectively, that contact the rail at fourth, fifth and sixth angles, respectively, relative to the ground plane.

In another aspect, the invention features a curved jet nozzle for an ultra-high pressure liquid jet system. The curved jet nozzle includes a frame configured to engage a rail. The curved jet nozzle also includes at least two liquid jet processing heads attached to the frame at different angles with respect to a ground plane. The curved jet nozzle also includes an ultra-high pressure liquid pump fluidly connected to the at least two liquid jet processing heads and configured to provide pressurized fluid to each of the at least two liquid jet processing heads to form one liquid jet that contacts the rail. In some embodiments, the at least two liquid jet processing heads are positioned to provide liquid jets that intersect each other at an acute angle to create a stream with a different trajectory that creates a smooth finish on the rail during a processing operation free of burl that remains after an initial cutting operation.

In another aspect, the invention features another method of operating an ultra-high pressure liquid jet system. The method includes positioning, on two rails spaced at a distance from each other, a translatable frame having (i) a set of wheels for contacting the two rails, and (ii) two sets of three liquid jet processing heads fluidly connected to an ultra-high pressure liquid pump, each set of three liquid jet processing heads aimed at one of the two rails. The method also includes providing, to the two sets of three liquid jet processing heads, from the ultra-high pressure liquid pump, pressurized fluid forming two sets of three liquid jets that contact the two rails. The method also includes translating the frame relative to the rails, thereby performing a processing operation on a linear length of the rails along a direction of translation.

In another aspect, the invention features a translatable, ultra-high pressure liquid jet system. The system includes first means for maintaining mechanical contact with a rail. The system also includes second means for providing a liquid jet that contacts the rail, the second means attached to the first means and configured to maintain a distance from the rail. The system also includes third means for supplying pressurized liquid to the second means, the third means in fluid communication with the second means.

In some embodiments, the invention is capable of re-profiling a rail (e.g., repairing or re-surfacing a damaged rail area or volume), removing the need for maintenance and removing only a small width (e.g., about 0.03 mm) of rail material in the process. In some embodiments, a "curved jet" abrasive waterjet nozzle can fan the liquid jet and/or reorient the waterjet in a curved manner. Such a curved jet nozzle can be formed by intersecting two linear or curvilinear water jets at an acute angle such that a merged stream is formed and flows with a changed trajectory before encountering a rail, or can be curved via another means. In some embodiments, the invention uses two connected mobile units that may have different speeds relative to one another (e.g., they may have different or intermittent movement, with one carrying the cutting head and another carrying the liquid reservoir). In some embodiments, motion of the cutting head can have multiple components (e.g., movement of the system itself along the rail and movement of the gantry or arm relative to the system). In some embodiments, a waterjet cutting head positioning mechanism can slide along one or more rails being treated. In some embodiments, the surface of the rails can be surface-treated with a liquid jet (e.g., a lower pressure water jet of less than about 20,000 PSI, e.g., 200-2,000 PSI).

Using one or more of the above distinctive features, the entire liquid jet system (e.g., including the pump, fluid supply, cutting head, etc.) can function while moving and process (e.g., repair and perform preventative maintenance on) one or more rails. The invention can thus provide a quick, inexpensive and clean way to recondition old or damaged rails, and to perform preventative maintenance on existing rails. The invention can perform processing most anytime and anywhere, including around corners and through junctions. In some embodiments, the invention is highly flexible from a logistical perspective, particularly as compared to hell trains, which can be very difficult and time consuming to move. In some embodiments, the invention provides negligible heat input into the rails (e.g., the rail temperature does not exceed 90° C., which has no appreciable influence on the rail), and this can increase the overall lifetime of the product and the rails.

In some embodiments, the invention is environmentally friendly, e.g., is capable of using recycled water, sand and metal. In some embodiments, the invention produces low noise levels as compared to existing technologies. In some embodiments, the invention does not produce any sparks, which can make the invention uniquely suited to resurfacing rails in certain higher risk environments, e.g., near chemical plants, in tunnels, and above water ways. In some embodiments, the invention produces high accuracy results, which causes less rework or fewer adjustments to need to be performed. In some embodiments, the invention provides a high quality surface finish, e.g., using a burl removal tool, which can operate on the rail after the main cutting operation is performed, and/or can include one or more "curved" jets (or "curved jet nozzles") as described herein.

In some embodiments, the invention supports at least two types of treatment: surface and re-profiling. Surface treatment can involve removing a chemical layer only (e.g., not steel or rail material), and for such applications no abrasive is typically used. Re-profiling can involve removing a surface layer of track, and for such applications an abrasive is typically used. In some applications, only 0.1-0.2 mm of rail is removed. In other applications, the invention can remove 1.0-2.0 mm of rail. Such treatments can help the rails endure for another 5-10 years of normal use before requiring further repair or replacement. In some embodiments, the cutting heads can be positioned anywhere between 0.1 mm to 60 mm away from the rail (e.g., 0.1 mm, 0.125", 0.5", or 1.5") for cutting applications. In some other embodiments, the cutting heads can be positioned anywhere between 20-50 cm away from the rail for spraying applications. In some embodiments, a polishing machine can be applied to the rails behind the cutting heads (e.g., using sandpaper) without imparting any substantial heat into the track. In some embodiments, only the inside edge of each rail is processed, as the outside edge does not contact the wheel of the rail-mounted train and thus does not need to be treated. In some embodiments, a diameter of the nozzle (e.g., orifice size) can be selected based upon the operation to be performed. For example, an orifice size of about 0.010"-0.045" can be used, optionally 0.010-0.025", optionally 0.010-0.016. In some embodiments, a mixing tube having a diameter of about two to three times as large as the orifice can be used.

BRIEF DESCRIPTION OF THE DRAWINGS

The foregoing discussion will be understood more readily from the following detailed description of the invention when taken in conjunction with the accompanying drawings.

DETAILED DESCRIPTION OF THE DRAWINGS

Figure 1A:
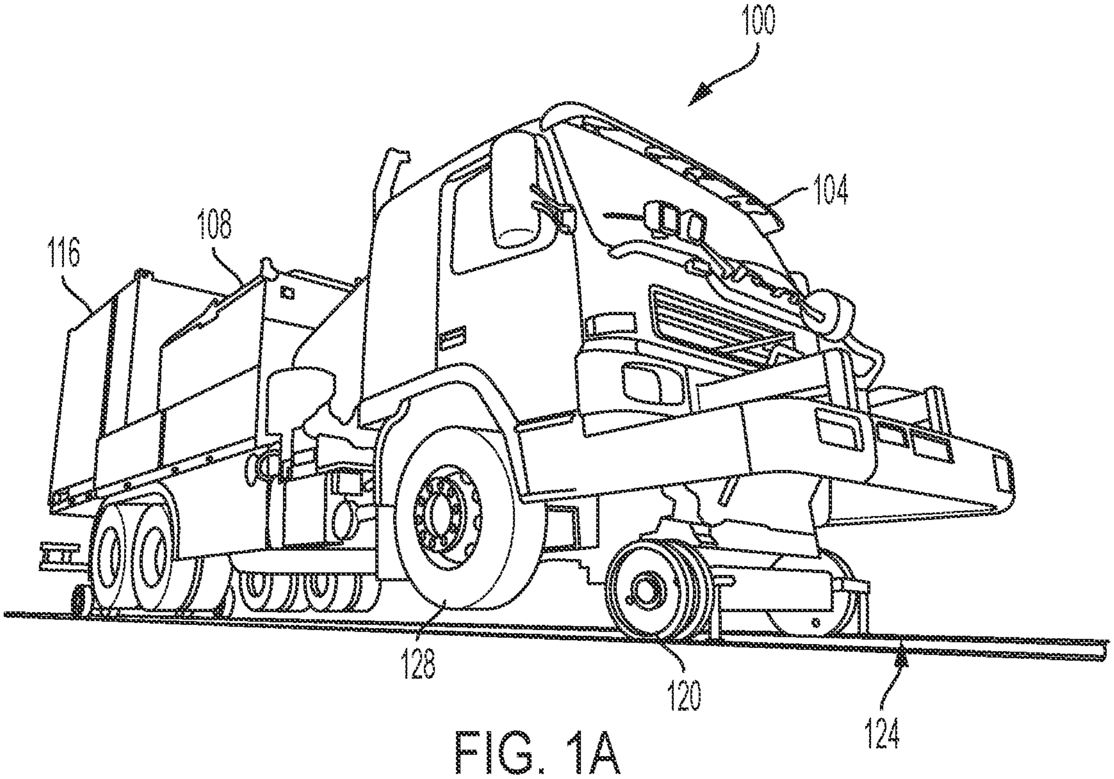
FIGS. 1A-1B are perspective views of a truck-mounted waterjet rail processing system disposed on a rail, according to an illustrative embodiment of the invention.
Figure 1B:
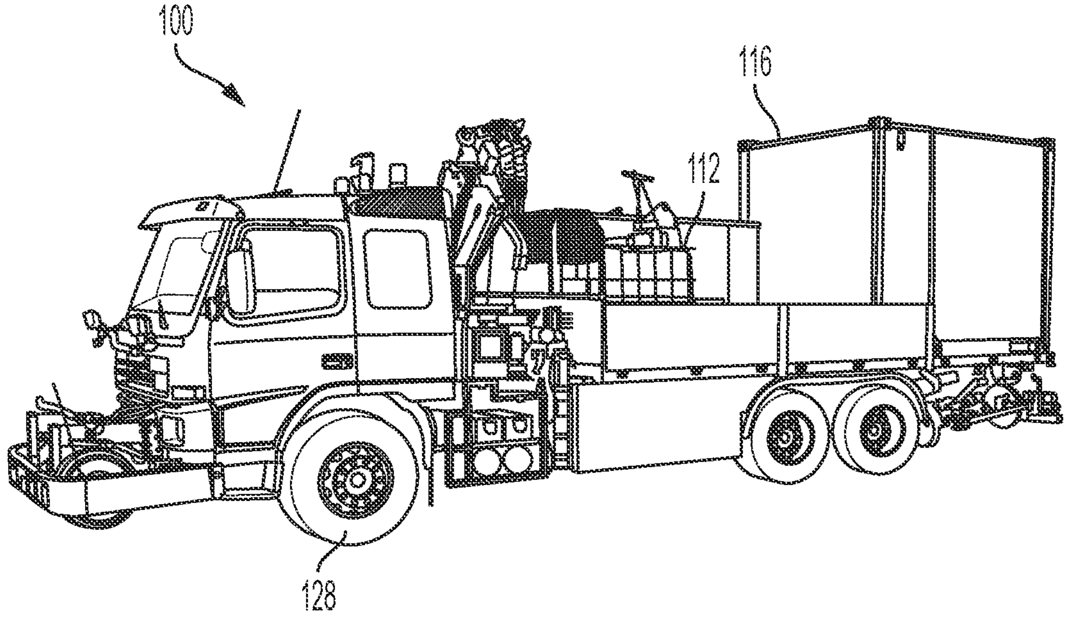

FIGS. 1A-1B are perspective views of a truck-mounted waterjet rail processing system (mobile cutting unit or MCU) 100 disposed on a rail 124, according to an illustrative embodiment of the invention. As shown, the MCU 100 includes a truck 104, which can be any suitable road-rail vehicle (e.g., based on a Volvo D13). The MCU 100 also includes a power source 108 (e.g., a 185 kVA generator), a fluid supply 112 (e.g., one or more water tanks), and an ultra-high pressure waterjet system 116 (e.g., a Enduromax or Maxiem pump as provided by Hypertherm, Inc.). The power source 108 is capable of producing constant and well-regulated electrical power in order to power waterjet cutting components (e.g., a pump and/or intensifier that minimizes pressure spikes and drops) of the waterjet system 116. The fluid supply 112 can include one or more reservoirs carrying the cutting liquid (e.g., having a capacity of at least 1,000 liters, such as about 4,000 liters) and can be stored in one or more tanks, e.g., concentrated toward the middle of the truck or dispersed throughout the truck for more even weight distribution. The cutting liquid may be a purified water, a waterjet cutting slurry, or another suitable mixture. The waterjet system 116 can be configured to process and/or cut at an ultra-high pressure, e.g., about 60,000 PSI. In some applications, the system 100 can mix with the supplied fluid an abrasive (e.g., garnet) that is fed into the high-pressure water stream to enhance cutting and/or processing operations.

The waterjet system 116 includes at least one cutting head (e.g., as shown and described below) to process the rail 124. The cutting head may be connected to the pump of the waterjet system 116 via flexible tubing or hosing to account for movement in the system. In some embodiments, the waterjet system 116 can include multiple (e.g., six) cutting heads. The waterjet system 116 can also include a gantry, robot arm, or other positioning mechanism to orient the waterjet cutting head relative to the rail 124 being repaired (e.g., as shown and described below). The waterjet system 116 can also include a CNC controller, such as an Edge® Connect system offered by Hypertherm, Inc., to position the cutting head and/or control its processing parameters. Thus, the invention can include a platform housing the generator, the waterjet pump and/or intensifier, the cutting head, the cutting liquid, the abrasive, and the controller, all fully operational while moving.

Figure 2:
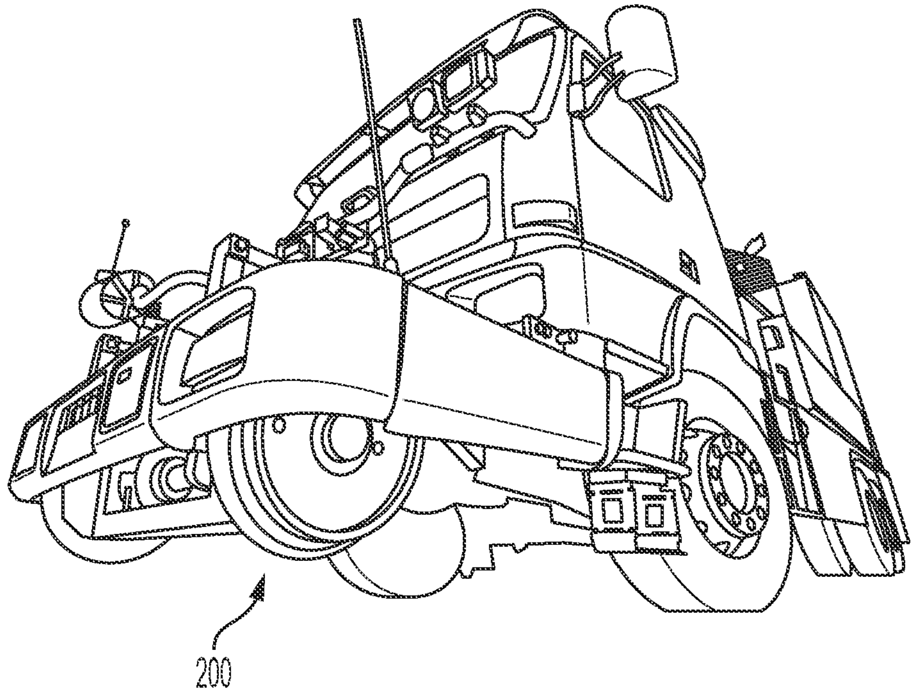
FIG. 2 is a close-up perspective view of a truck-mounted waterjet rail processing engagement motion system, according to an illustrative embodiment of the invention.

The MCU 100 includes a rail engagement motion system 120, which can engage and maintain mechanical contact with the rails 124. Before operation, the truck 104 can drive as it would normally (e.g., as shown in FIG. 2, in which the rail engagement motion system 200 is in a disengaged position) to situate itself on the rails 124. The system 120 can include a burl removal tool trailing the cutting heads to remove and/or crush any remaining burls. This burl removal tool may be a part of a trailing wheel on positioning mechanism 300 or a separate attachment. During operation, the rail engagement motion system 120 can lower into place and elevate the truck 104 such that the truck tires 128 do not maintain contact with the ground or the rails 124 (e.g., as shown in FIG. 1A). The MCU 100 can then move along the rails 124 using the rail engagement motion system 120 to move about the rails during a rail processing operation, e.g., cleaning or cutting. Thus, the MCU 100 can be a self-contained, fully functional and mobile waterjet cutting system. In some embodiments, one or more components of the system may be mobile even though they do not directly engage with the rails 124.

Figure 3:
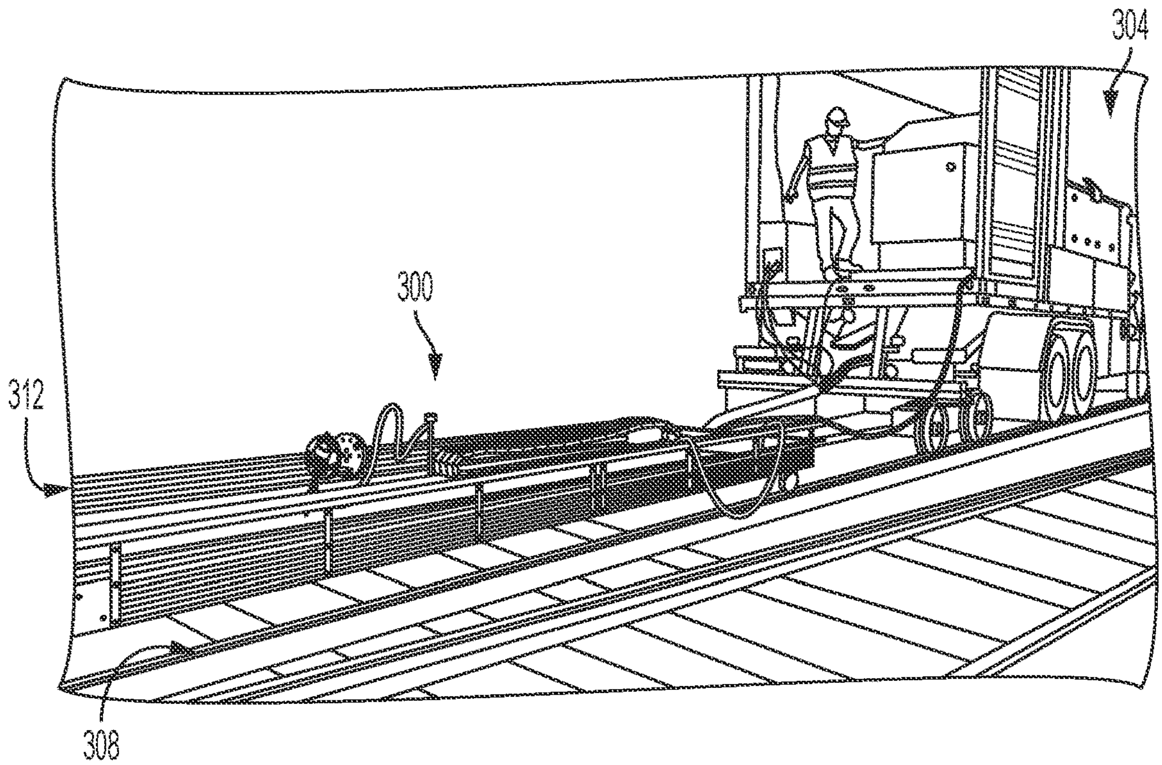
FIG. 3 is a perspective view of a positioning mechanism for a waterjet rail processing system towed in operation behind a waterjet rail mobile cutting unit (MCU), according to an illustrative embodiment of the invention.

FIG. 3 is a perspective view of a positioning mechanism 300 for a waterjet rail processing system towed in operation behind a waterjet rail mobile cutting unit (MCU) 304, according to an illustrative embodiment of the invention. The positioning mechanism 300 allows for a great deal of independent motion of the cutting head along the rails 308 without dependence on the MCU 304 motion itself. In some embodiments the positioning mechanism 300 can be included within a trailer 312 (or attachable car or other suitable mobile piece) connected to the MCU 304. The trailer 312 can be a gantry style mechanism that controls the movement of the cutting head. As the MCU 304 pulls (or pushes) the trailer 312 forward, the cutting head processes the passing rails 308. In this configuration the gantry can move the cutting head while the MCU 304 is in motion (e.g., supplementing the motion provided by the MCU 304 itself into a processing operation on the rails) or allow for the system to be operated in a section by section manner (e.g., processing sections of the rails 308 while the MCU 304 is stationary).

Figure 4:
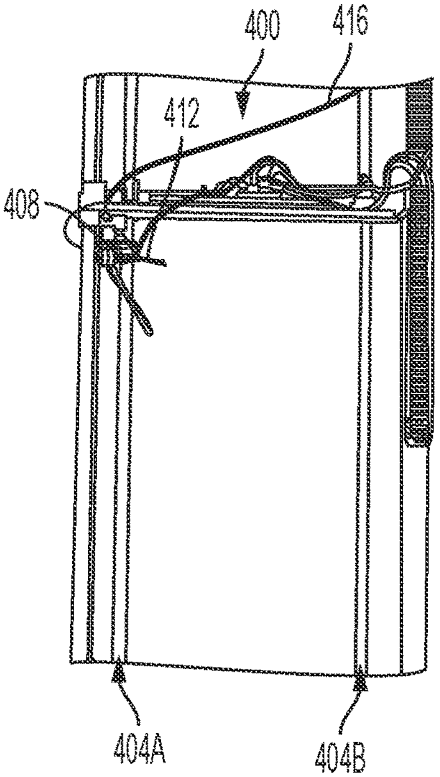
FIG. 4 is a top view of a positioning system for a waterjet rail MCU mounted on two rails, according to an illustrative embodiment of the invention.

FIG. 4 is a top view of a positioning system 400 for a waterjet rail MCU mounted on two rails 404A, 404B, according to an illustrative embodiment of the invention. In operation, the portable truck system (e.g., as shown and described above) is positioned on the railroad tracks 404A, 404B such that the truck may drive along the rails 404A, 404B it is processing. The positioning system 400 includes at least one cutting head 408, and once positioned on the rails 404A, 404B, the cutting head 408 is oriented relative to the rails 404A, 404B that are to be processed. The generator supplies power to the waterjet pump and/or intensifier, control mechanisms and/or gantry, and the CNC. The intensifier receives the water from the water reservoir and pressurizes the water to ultra-high pressure (e.g., above 20,000 psi), and preferably to about 60,000 psi and/or other high pressures (e.g., about 90,000 psi) as are known in the waterjet cutting industry. The pressurized water is directed through the tubing 416 to the cutting head 408, where the water is mixed with an abrasive, e.g., garnet. As a water jet 412 exits the cutting head 408, it cuts or shaves away a portion of the rail 404A.

Figure 5:
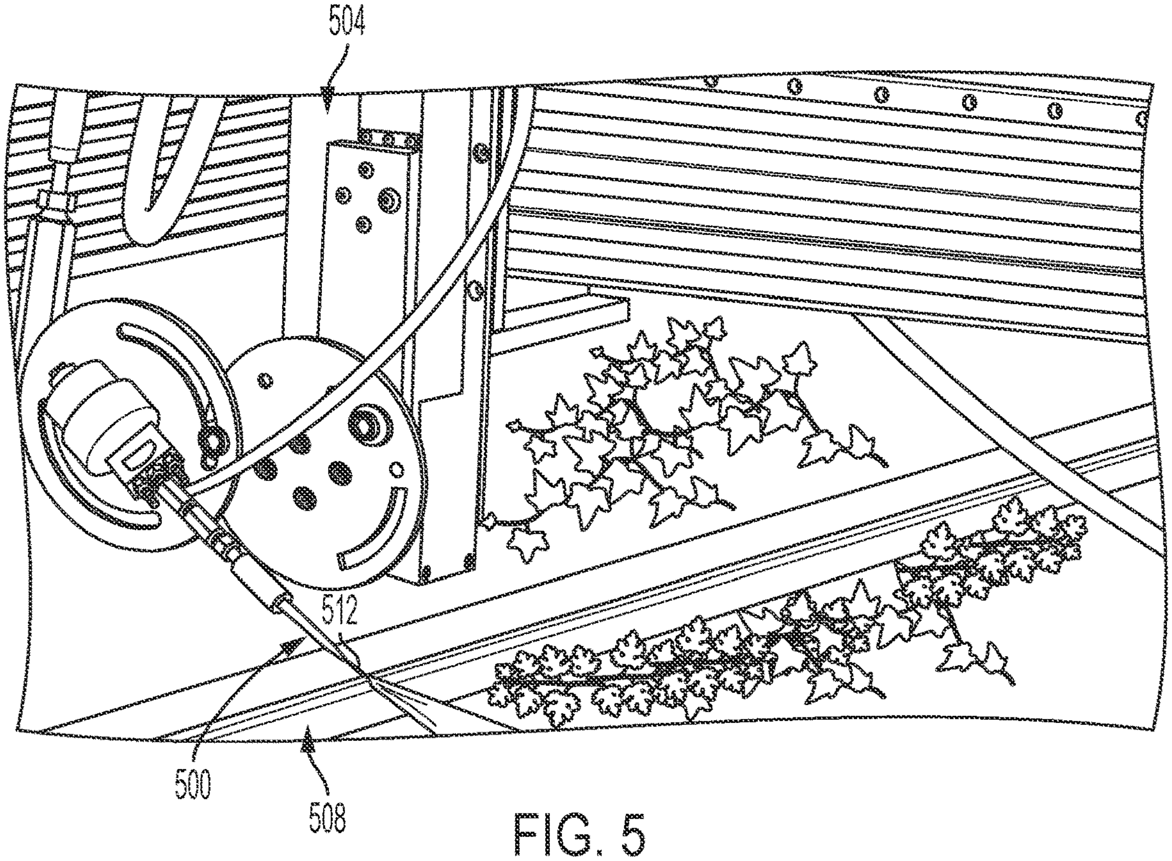
FIG. 5 is a perspective view of a cutting head attached to a positioning system while processing a rail, according to an illustrative embodiment of the invention.

FIG. 5 is a perspective view of a cutting head 500 attached to a positioning system 504 while processing a rail 508 (via liquid jet 512), according to an illustrative embodiment of the invention. The positioning mechanism 504 may provide controlled motion of the cutting head 500 relative to the frame of the positioning mechanism 504, moving the jet across and/or along the rail 508 in any number of patterns and/or profiles. In some embodiments, the motion paths of the MCU (as shown above), the positioning mechanism 504, and/or the cutting head 508 are controlled or varied relative to one another sufficient to result in a desired cut finish, shape, and/or profile on rail 508. In some embodiments, the positioning mechanism 504 controls the cutting head 500 relative to the rail 508 it is cutting. Such a feature can be important because rails can be imprecise and can vary in width—e.g., they may not be perfectly straight, or may only be straight enough or positioned well enough to support a train. In another embodiment, multiple cutting heads are disposed on the positioning mechanism 504 and are moved relative one another to generate multiple profiles on a rail or to cut on more than one rail (e.g., as described in greater detail below).

The current invention can provide improved positioning and movement of a traditional liquid jet cutting head. Typical cutting heads are movable on a fixed grid (e.g., in an x-y direction), but in the present invention, an angular adjustment mechanism can be provided to move the angle of the liquid jet relative to the rail. Such a mechanism can have distinct advantages in the context of the invention because of the unique angles and proximity to the ground that can be desirable. For example, in a typical liquid jet cutting setup, it is immaterial how wide the cutting head is, but in the current context, there are tighter geometrical constraints. For example, the cutting head needs to be positioned high enough off the ground so that it does not encounter debris on the ground, such as stones, or bolts that ascend upward from the base of the tracks—but low enough to actually contact the rails, and adjustable to contact the rails at the desired angle. The available space for cutting heads becomes particularly tight in setups involving multiple cutting heads, especially if they are positioned low to the ground. For such cases, the invention can include a narrower, thinner cutting head.

Figure 6:
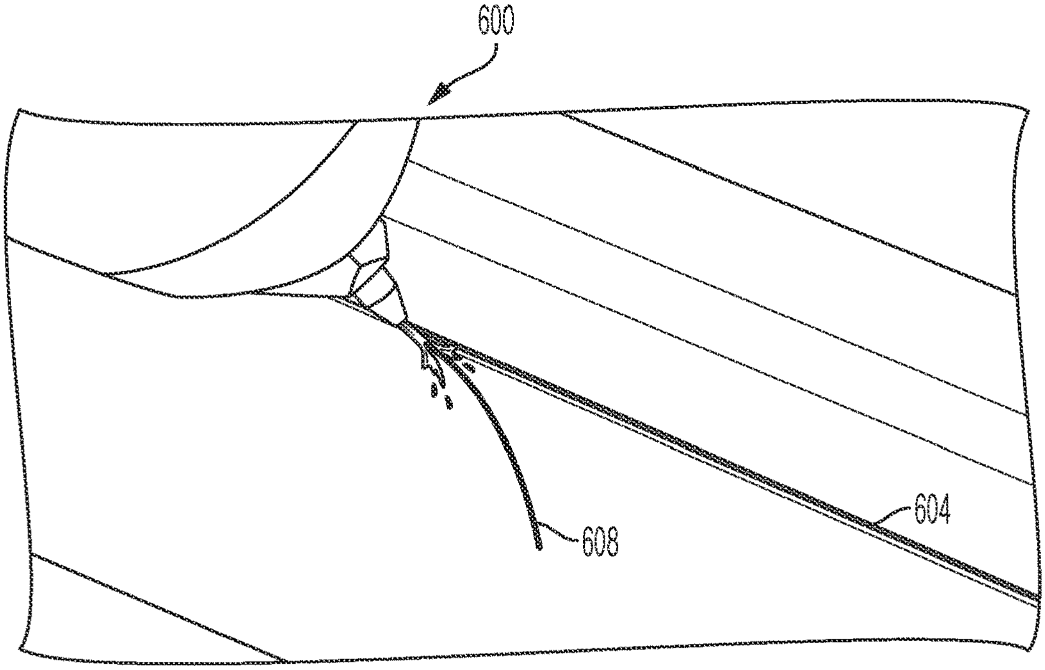
FIG. 6 is a schematic illustration of a waterjet of a MCU processing a rail surface, according to an illustrative embodiment of the invention.

FIG. 6 is a schematic illustration of a waterjet of a MCU 600 processing a rail surface 604, according to an illustrative embodiment of the invention. As shown, a small strip of rail 608 (e.g., with surface irregularities) can be removed, leaving a clean finish on the rail surface 604. In some embodiments, the invention may process over 500 meters of rails per hour. In this fashion, the use of a waterjet can provide significant advantages over grinding trains, which are prohibited in tunnels, near chemical plants, when fire danger is high such as dry conditions, and in many other cases. Furthermore, certain rail for freight trains is extremely hard and cannot be re-shaped using the grinding train. Waterjet enables the refurbishing of these rails, eliminating or deferring the need for very costly replacement. In some embodiments, the invention includes a pump, hp water delivery lines, and/or a cutting head positioned on a mobile frame to ride on or over the rails. This platform is then physically connected to a stationary generator or the grid or land power and a local water supply. During a processing operation where the liquid jet(s) are reprofiling and/or reshaping a rail (e.g., cutting and/or removing portions of the rail) the distance from the nozzle to the track varies between about 0.1 millimeters and about 39 millimeters; generally in the range of between about 0.1 millimeters and about 13 millimeters; and in some embodiments preferably in the range of about 0.1 millimeters to about 4 millimeters. The distance between the tip of the nozzle of the liquid jet cutting head can be selected based on the processing operation being performed. In some embodiments, it is preferred to select a distance that is as small as possible to minimize liquid jet stream dispersion in the atmosphere and to have a compact and precise focus and/or impact point on the rail being processed.

The liquid jet itself is typically circular, as it emerges from the nozzle of the waterjet cutting head and has a diameter that is controlled by the orifice and/or mixing tube of the liquid jet cutting head. The diameter of the liquid jet as it emerges from the nozzle tip is in the range of about 0.005 inches to about 0.120 inches; and is optionally in the range of about 0.0075 inches to about 0.045 inches; and is optionally in the range of between about 0.010 inches and 0.025 inches. In some embodiments, the preferred range is between about 0.010 inches and 0.016 inches. Typically the mixing tube is about three times as large as the orifice, although in some embodiments it can be about 2 times as large. The diameter of the liquid jet stream can be adjusted and/or selected based upon the chosen process. The cross-sectional area of the liquid jet stream at the impact and/or focus point on the rail is typically in the range of about 0.00002 $in^2$ to about 0.06 $in^2$; and can be in the range from about 0.00004 $in^2$ to about 0.0016 $in^2$; and can be in the range from about 0.00008 $in^2$ and 0.0005 $in^2$. In some embodiments, the range is preferably between about 0.00008 $in^2$ and 0.0002 $in^2$.

Figure 7A:
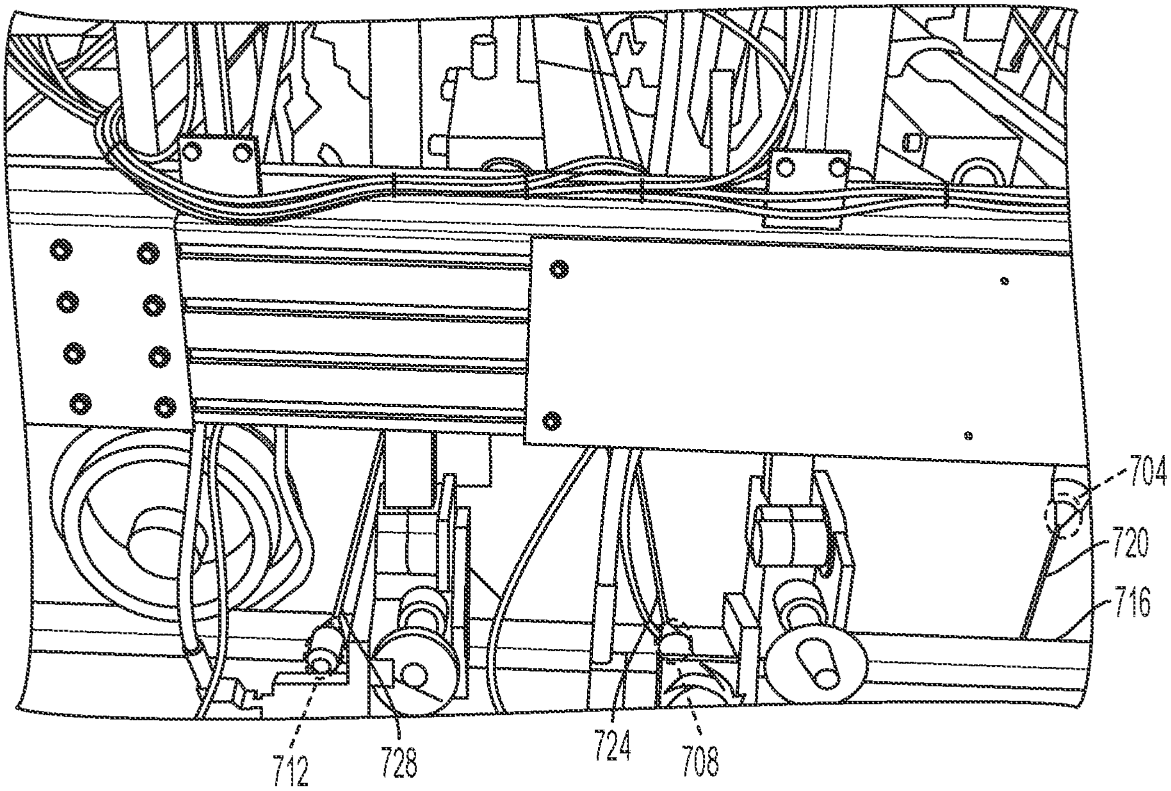
FIG. 7A is a side-view illustration of three waterjet cutting heads processing a rail surface, according to an illustrative embodiment of the invention.
Figure 7B:
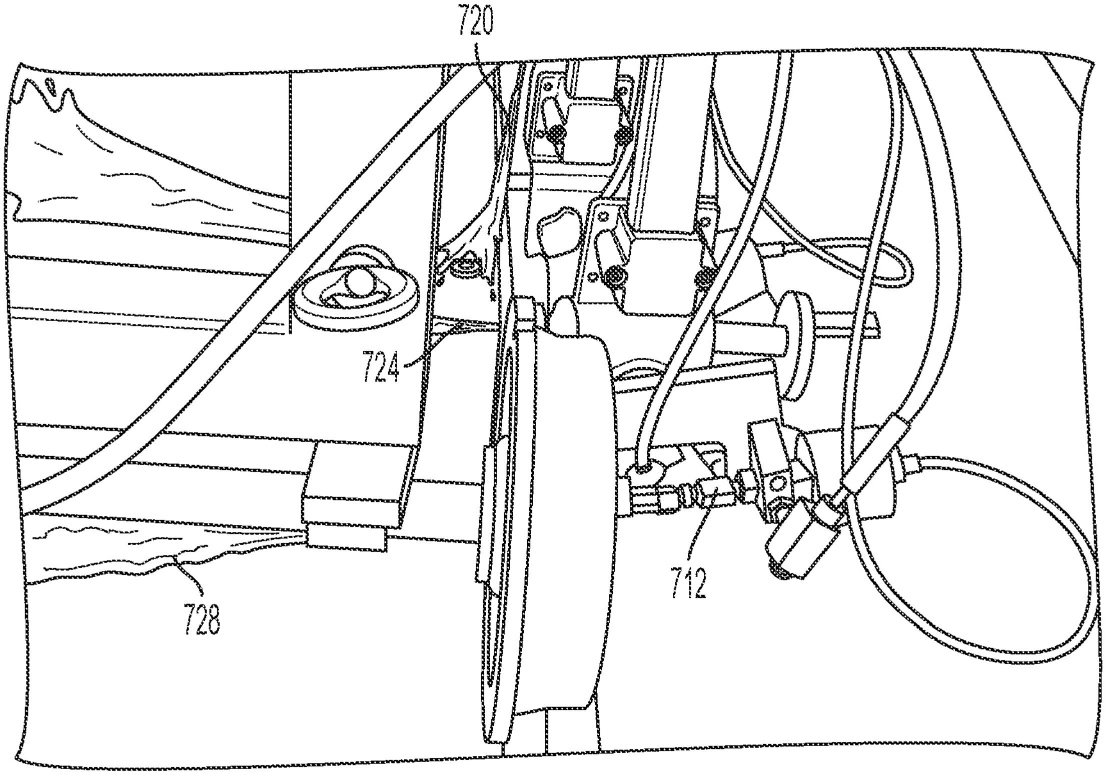
FIG. 7B is a head-on view illustration of three waterjet cutting heads processing a rail surface, according to an illustrative embodiment of the invention.
Figure 7C:
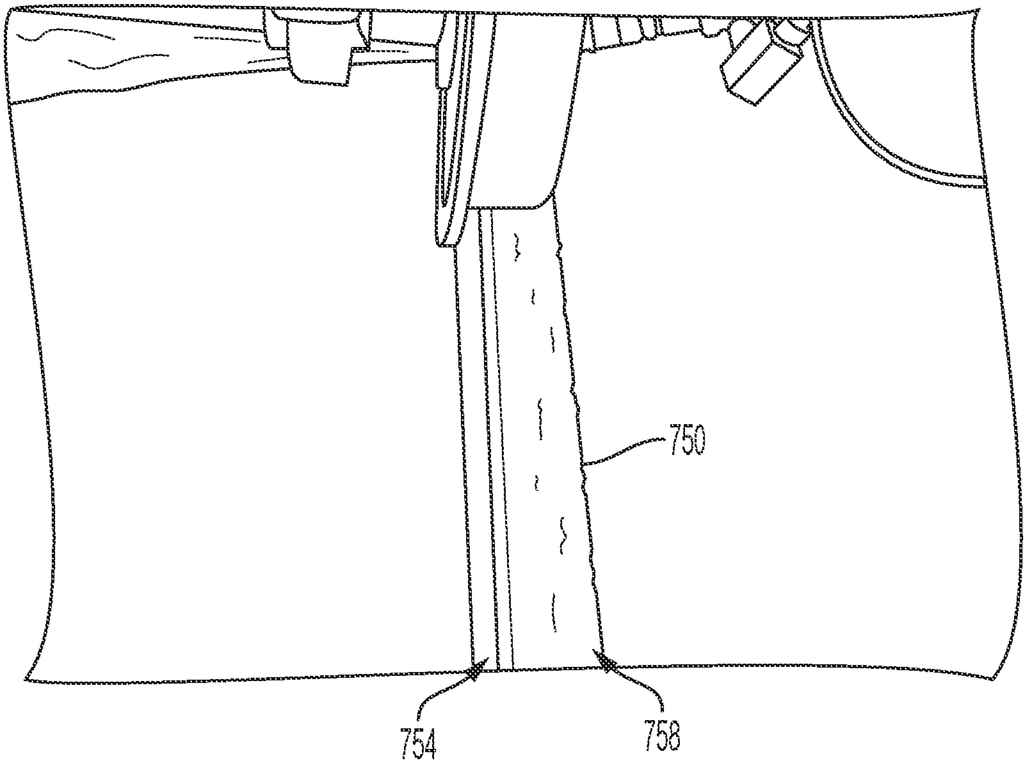
FIG. 7C is an illustration of a rail 750 that has undergone a processing operation, according to an illustrative embodiment of the invention.

FIG. 7A is a side-view illustration of three waterjet cutting heads 704, 708, 712 processing a rail surface 716, according to an illustrative embodiment of the invention. In this view the waterjet cutting head 704 provides a first water jet 720 that impinges upon the rail surface 716 at a first angle with respect to the ground. As the system translates in a left-to-right direction, the second waterjet cutting head 708, which provides a second water jet 724 that impinges upon the rail surface 716 at a second angle with respect to the ground, passes over substantially the same treated area as was just contacted by the first water jet 720. The second water jet 724 removes additional rail material due to the differences in positioning and angle with respect to the rail surface 716. The third waterjet cutting head 712 provides a third water jet 728, which impinges upon the rail 716 at a third angle with respect to the ground, again removing additional rail material due to differences in positioning and angle. The details of the impingement can be seen in FIG. 7B, which is a head-on view illustration of the three waterjet cutting heads 704, 708, 712 of FIG. 7A. FIG. 7C is an illustration of a rail 750 that has undergone a processing operation (e.g., by the waterjets shown and described above), according to an illustrative embodiment of the invention. The processed rail 750 includes a finished inner edge 754, which can be a reduced height and/or width as compared with the unfinished outer edge 758, and can have a smooth, fresh appearance, free of wear and tear such as oxidation and surface dings. Further details of possible cutting geometries for multiple cutting heads are shown below in FIGS. 11A-11B and FIGS. 12A-12G.

Figure 8:
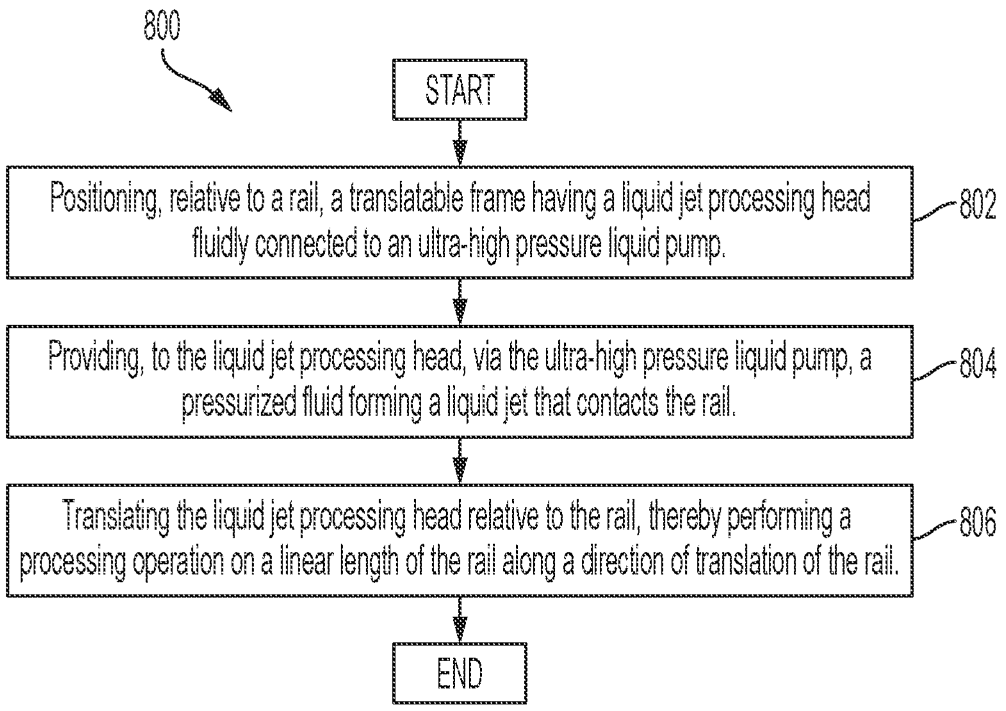
FIG. 8 is a flowchart of a method of operating an ultra-high pressure liquid jet system, according to an illustrative embodiment of the invention.

FIG. 8 is a flowchart of a method 800 of operating an ultra-high pressure liquid jet system, according to an illustrative embodiment of the invention. In a first step 802, a translatable frame is positioned relative to a rail, the translatable frame having a liquid jet processing head fluidly connected to an ultra-high pressure liquid pump. In a second step 804, the liquid jet processing head is provided, via the ultra-high pressure liquid pump, a pressurized fluid forming a liquid jet that contacts the rail. In a third step 806, the liquid jet processing head is translated relative to the rail, thereby performing a processing operation (e.g., shaping, re-profiling, or removing a rail portion) on a linear length of the rail along a direction of translation of the rail.

Figure 9A:
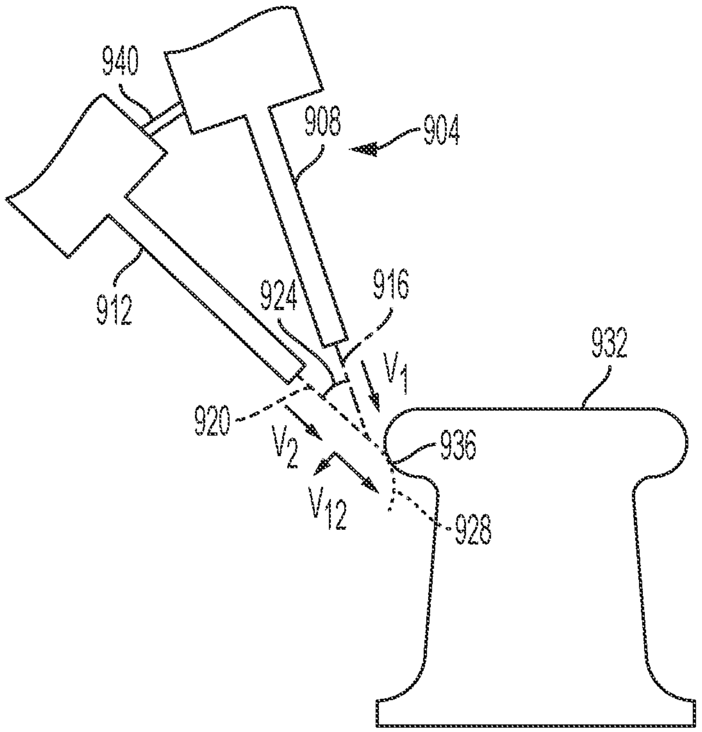
FIG. 9A is an illustration of a curved jet nozzle for a liquid jet material processing system having two cutting heads with straight nozzles, according to an illustrative embodiment of the invention.

FIG. 9A is an illustration of a curved jet nozzle 904 for a liquid jet material processing system having two cutting heads 908, 912 with straight nozzles, according to an illustrative embodiment of the invention (collectively referred to as one type of "curved jet nozzle"). The cutting head 908 provides a first water jet 916 leaving with a velocity shown by a first vector $v_1$, while the cutting head 912 provides a second water jet 920 leaving with a velocity shown by a second vector $v_2$. The first water jet 916 intersects with the second water jet 920 at an angle 924 to form a third water jet 928 having a composite velocity shown by a third vector $v_{12}$. The third vector $v_{12}$ can have components based on $v_1$ and $v_2$ that causes the third water jet 928 to take on a different trajectory. The third water jet 928 can contact the rail 932 at a contact point or surface 936. The contact can be such that a "lighter touch" is achieved and a buffed, polished or finished edge is created, rather than one with jagged or crooked edges. For example, as fluid leaves the cutting heads 908, 912 in the form of a liquid jet, it can become subject to several environmental factors including air resistance, turbulence, and the like, which can in the aggregate have the net effect of smoothing over a harder edge. These factors can increase as the fluid jet travels a greater distance away from and out of the cutting heads 908, 912. The cutting heads 908, 912 can be mounted to a frame 940 that holds them in place. The jets can have many shapes, e.g., linear, curvilinear, fan, or bulging fan shapes, as shown below in FIGS. 10A-C.

Figure 9B:
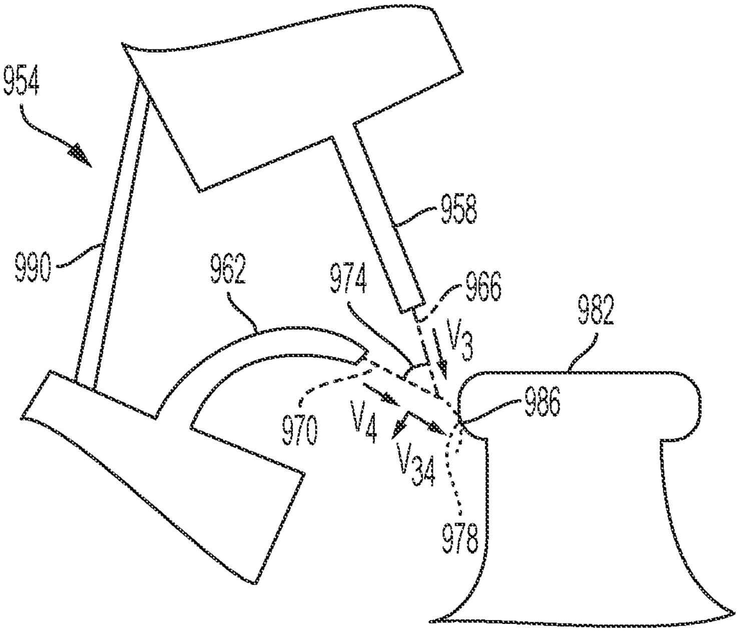
FIG. 9B is an illustration of a curved jet nozzle for a liquid jet material processing system having one straight nozzle and one curved nozzle, according to an illustrative embodiment of the invention.

FIG. 9B is an illustration of another curved jet nozzle 954 for a liquid jet material processing system having one straight nozzle 958 and one curved nozzle 962, according to an illustrative embodiment of the invention. The cutting head 958 provides a first water jet 966 leaving with a velocity shown by a first vector $v_3$, while the cutting head 962 provides a second water jet 970 leaving with a velocity shown by a second vector $v_4$. The first water jet 966 intersects with the second water jet 970 at an angle 974 to form a third water jet 978 having a composite velocity shown by a third vector $v_{34}$. The composite velocity vector $v_{34}$ can have components based on $v_3$ and $v_4$ that causes the third water jet 978 to take on a different trajectory, e.g., as shown above in FIG. 9A. The third water jet 978 can contact the rail 982 at a contact point or surface 986. The contact can be such that a "lighter touch" is achieved and a buffed, polished or finished edge is created, rather than one with jagged or crooked edges, as above. In some embodiments, the "curved" waterjet nozzle reorients the waterjet in a curved manner so as to reach multiple surfaces of the rail (e.g., a side or under surface of the rail) or to impinge on the workpiece at a specific angle. This configuration can reduce or eliminate dross from the process and/or provide much greater control over beveling. The cutting heads 958, 962 can be mounted to a frame 990 that holds them in place and/or manipulates them about rail 982. One or more cutting heads (e.g., 962) can be curved to allow more strategic and precision positioning and to avoid the problem of more bulky straight cutting heads spatially interfering with one another. The jets can have many shapes, e.g., linear, curvilinear, or fan shapes. In one embodiment, the water jet is substantially circular and radially symmetrical (e.g., not a flat jet spray).

Figure 10A:
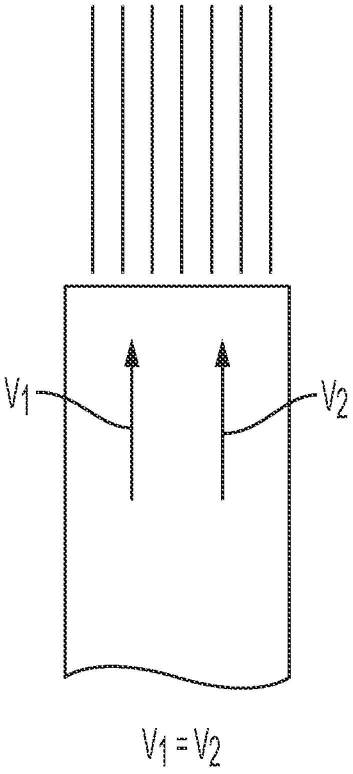
FIGS. 10A-10C are illustrations of several fluid flow profiles of liquid emerging from different liquid jet cutting head nozzles, according to an illustrative embodiment of the invention.
Figure 10B:
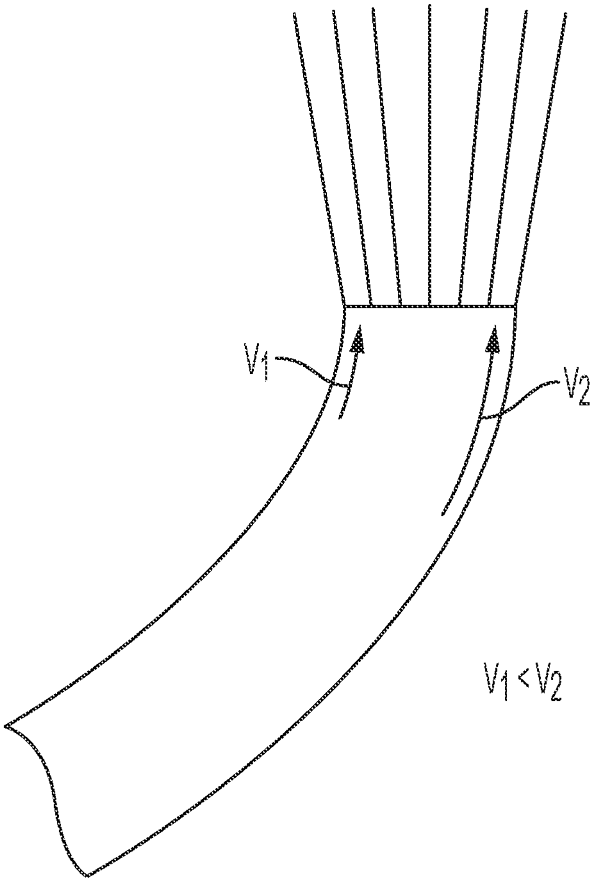
Figure 10C:
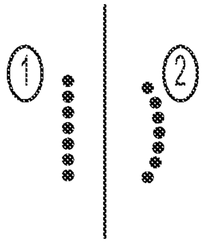

FIGS. 10A-10C are illustrations of several fluid flow profiles of liquid emerging from different liquid jet cutting head nozzles, according to an illustrative embodiment of the invention. As can be seen in FIG. 10A, fluid flowing down the left side of a straight nozzle will have a velocity equal or approximately equal to fluid flowing down the right side, such that $v_1=v_2$, and the fluid will emerge in a straight stream initially (as external air resistance will be approximately uniform across the stream) and will gradually dissipate. However, in a curved nozzle, fluid flowing down the left side can have a smaller velocity than fluid flowing down the right side, as the fluid on the right side subtends a larger arc during its travel. In this case, $v_2$ can be greater than $v_1$, and there can be an asymmetry in the external forces (e.g. air resistance) that the fluid encounters upon exiting the nozzle. As a result, a "fanned" stream can emerge, such as shown in FIG. 10B. In some instances, either the flow profiles in FIG. 10A or FIG. 10B can look linear from the side, as shown in the left of FIG. 10C (flow profile (1)), but local deformations in the geometry of the nozzle can also cause the profile to bulge as shown in the right side of FIG. 10C (flow profile (2)).

Figure 11A:
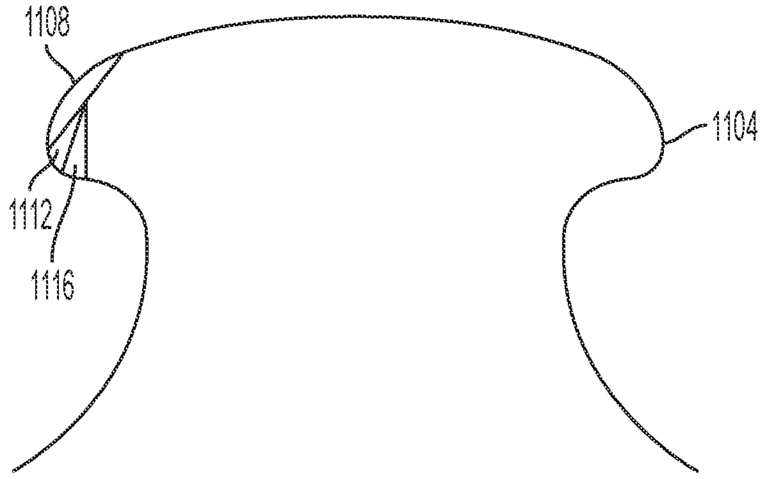
FIGS. 11A-11B are cross-sectional illustrations of several geometric rail cutting schemes by one or more liquid jets, according to an illustrative embodiment of the invention.
Figure 11B:
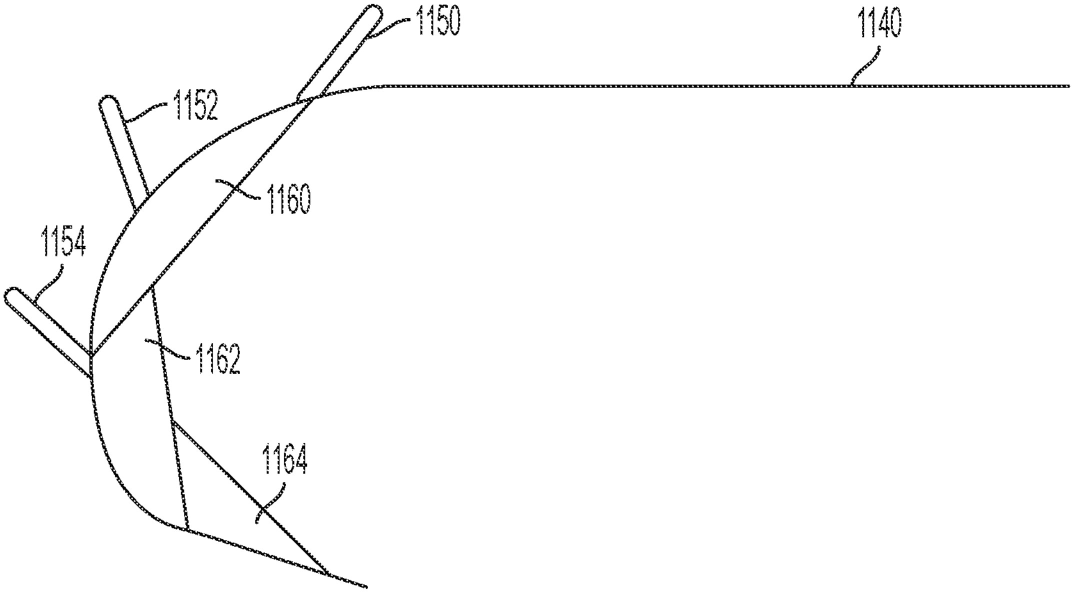

FIGS. 11A-11B are cross-sectional illustrations of several geometric rail cutting schemes by one or more liquid jets, according to an illustrative embodiment of the invention. FIG. 11A shows a first rail 1104 that is sectioned in three cuts, removing section 1108 first, section 1112 second, and section 1116 third. In some embodiments, air resistance, turbulence and other influences can have the net effect of "smoothing" out these hard lines, as described above. Thus, successive cuts can contribute to an overall smoother finish. FIG. 11B shows a second rail 1140 sectioned in three pieces as well by three jets 1150, 1152, 1554, e.g., section 1160 first, section 1162 second, and section 1164 third.

Figure 12A:
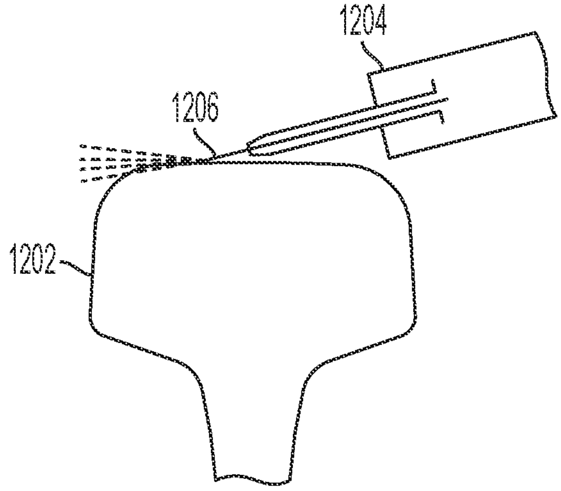
FIGS. 12A-12G are illustrations of several grinding and cutting configurations for one or more rail-processing liquid jets, according to an illustrative embodiment of the invention.
Figure 12B:
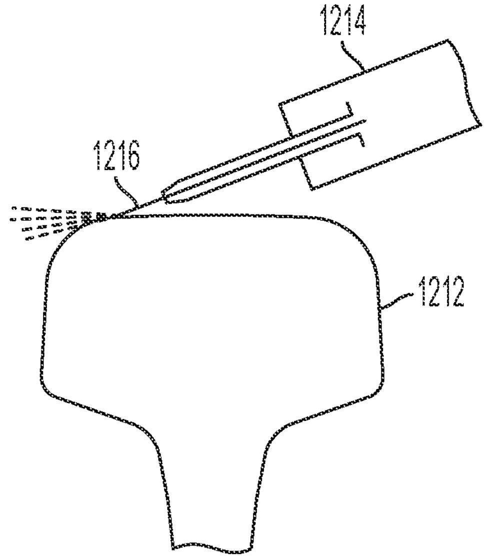
Figure 12C:
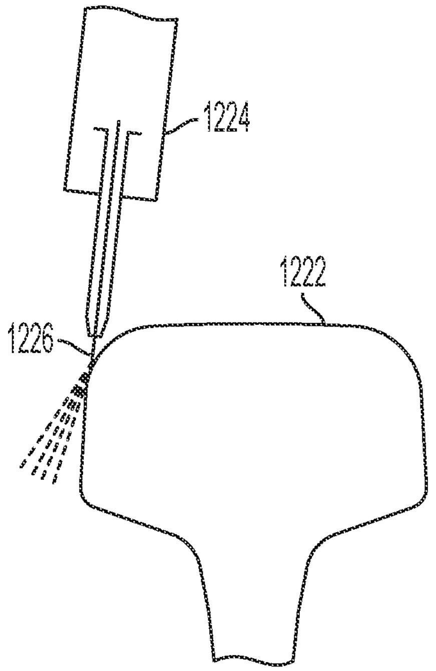
Figure 12D:
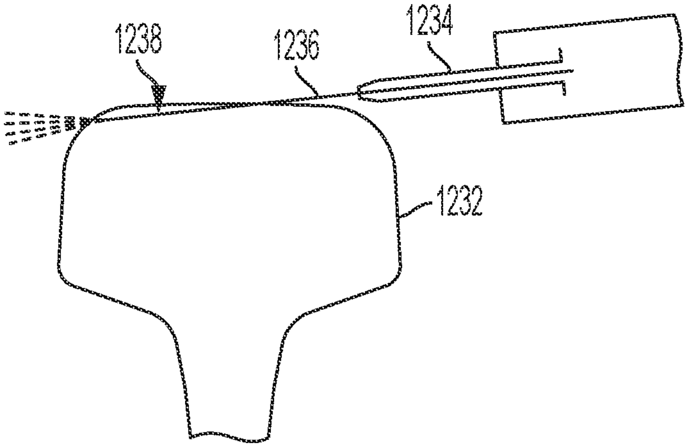
Figure 12E:
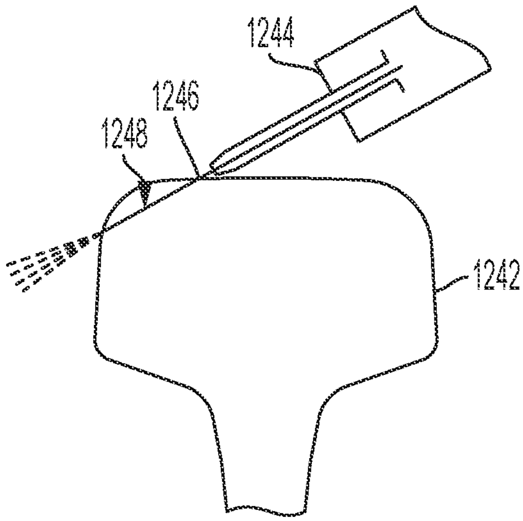
Figure 12F:
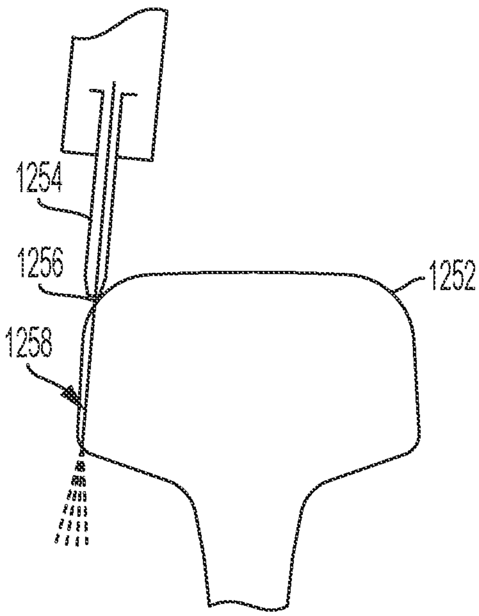
Figure 12G:
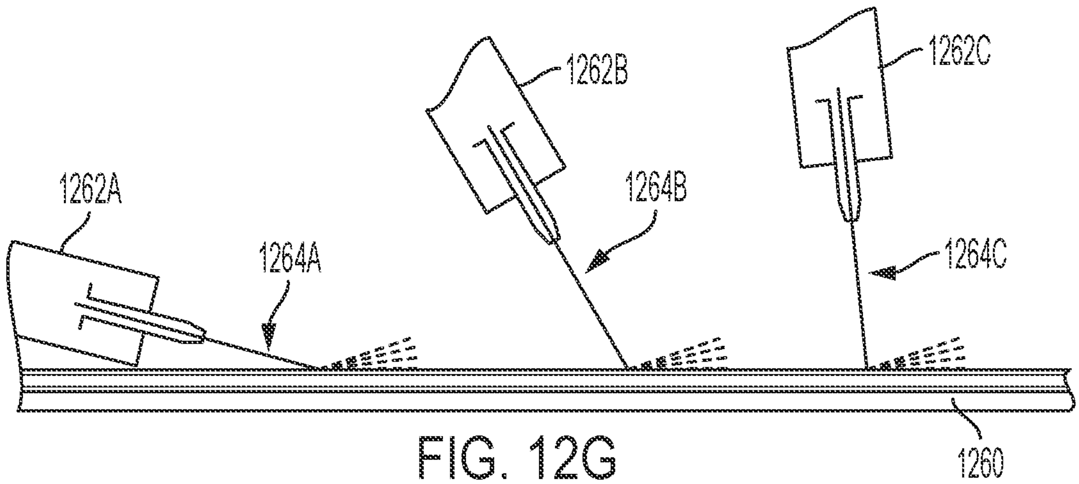

FIGS. 12A-12G are illustrations of several profiling, reshaping, and/or cutting configurations for one or more rail-processing liquid jets, according to an illustrative embodiment of the invention. In FIG. 12A, the rail 1202, shown in cross section, receives from a first cutting head 1204 a stream 1206 at a first angle for a grinding operation. In FIGS. 12B-12C, the same rail (shown as 1212, 1222 at different points in time) receives from second and third cutting heads 1214, 1224 second and third streams 1216, 1226 respectively at second and third angles, respectively, for similar operations. In FIGS. 12D-12F, the rail 1232 (also shown as 1242, 1252 at different points in time) receives from cutting heads 1234, 1244, 1254 liquid jets 1236, 1246, 1256 and remove rail sections 1238, 1248, 1258. In FIG. 12G, the same rail 1260 receives from cutting heads 1262A, 1262B, 1262C liquid jets 1264A, 1264B, 1264C, which intersect the rail for a re-profiling operation and each disperse in a spray.

These configurations are exemplary and demonstrate the wide variety of cutting and grinding operations made possible by the current invention. In some embodiments, the invention can be used for re-profiling and/or conditioning. For example, in a re-profiling operation, multiple nozzles may be positioned lengthwise, perpendicular to the rail, or at another angle to the rail. In some embodiments, to remove material, the nozzles are positioned close to the rail (e.g., so the stream velocity is high and not as impacted by dissipative forces such as air resistance). In some embodiments, in a finishing operation, the nozzles are positioned further away from the rail. In some embodiments, the angle of impingement can depend on the force needed at impact, which can in turn depend on the operation to be achieved (e.g., heavy damage may warrant a different angle than lighter damage). In a conditioning operation, to remove an undesirable layer off the rail, one or more nozzles can be positioned lengthwise with respect to the rail, e.g., as in FIG. 12G. The amount of abrasive used can be varied, as can the speed of the MCU. In some embodiments, to remove a very thick and hard layer, the MCU can travel at less than 1 mph, e.g., 0.1-0.5 mph. For less persistent layers, the MCU can travel faster, e.g., up to 25 mph.

While the invention has been particularly shown and described with reference to specific preferred embodiments, it should be understood by those skilled in the art that various changes in from and detail may be made therein without departing from the spirit and scope of the invention as defined by the following claims.

What is claimed is:

1. A method of operating an ultra-high pressure liquid jet system, the method comprising:

positioning, relative to a rail, a translatable frame having a liquid jet processing head fluidly connected to an ultra-high pressure liquid pump;

providing, to the liquid jet processing head, via the ultra-high pressure liquid pump, a pressurized fluid forming a liquid jet that contacts the rail such that the pressurized fluid is at least 20,000 PSI during a rail cutting operation or a re-profiling operation;

providing an abrasive feed system coupled to the liquid jet processing head to provide an abrasive to the liquid jet; and translating the liquid jet processing head relative to the rail, thereby performing a processing operation on a linear length of the rail along a direction of translation of the rail.

2. The method of claim 1 wherein the frame includes one or more wheels configured to engage the rail.

3. The method of claim 1 wherein a movement of the ultra-high pressure liquid pump corresponds to translation of the frame.

4. The method of claim 1 wherein the ultra-high pressure liquid pump is fixedly connected to the frame.

5. The method of claim 1 wherein the ultra-high pressure liquid pump is disposed on a unit separate from the frame and is capable of moving at a different speed than the frame.

6. The method of claim 1 wherein the liquid jet processing head is configured to provide the liquid jet to the rail at an angle relative to a ground plane.

7. The method of claim 1 wherein the ultra-high pressure liquid pump is included in a second frame moveable independently of the translatable frame during operation of the liquid jet system, and further including translating the second frame at a different speed than the translatable frame during operation of the liquid jet system.

8. The method of claim 1 wherein the frame further includes second and third liquid jet processing heads fluidly connected to the ultra-high pressure liquid pump, and further including providing, to the second and third liquid jet processing heads, via the ultra-high pressure liquid pump, pressurized fluid forming second and third liquid jets, respectively, that contact the rail at second and third angles, respectively, relative to the ground plane.

9. The method of claim 8 wherein the frame further includes fourth, fifth and sixth liquid jet processing heads in fluid communication with the ultra-high pressure liquid pump, and further including providing, to the fourth, fifth and sixth liquid jet processing heads, via the ultra-high pressure liquid pump, pressurized fluid forming fourth, fifth and sixth liquid jets, respectively, that contact the rail at fourth, fifth and sixth angles, respectively, relative to the ground plane.

10. The method of claim 1 further including adjusting at least one of an abrasive or a speed setting to adjust a finish of the rail.

11. A method of operating an ultra-high pressure liquid jet system having a pressurized fluid that is at least 20,000 PSI during a rail cutting operation or a re-profiling operation, the method comprising:

positioning, on two rails spaced at a distance from each other, a translatable frame having (i) a set of wheels for contacting the two rails, and (ii) two sets of three liquid jet processing heads fluidly connected to an ultra-high pressure liquid pump, each set of three liquid jet processing heads aimed at one of the two rails;

providing an abrasive feed system coupled to the liquid jet processing head to provide an abrasive to the liquid jet;

providing, to the two sets of three liquid jet processing heads, from the ultra-high pressure liquid pump, pressurized fluid forming two sets of three liquid jets that contact the two rails; and translating the frame relative to the rails, thereby performing a processing operation on a linear length of the rails along a direction of translation.

12. A method of operating an ultra-high pressure liquid jet system, the method comprising:

positioning, relative to a rail, a translatable frame having a liquid jet processing head fluidly connected to an ultra-high pressure liquid pump;

providing, to the liquid jet processing head, via the ultra-high pressure liquid pump, a pressurized fluid forming a liquid jet that contacts the rail;

providing an abrasive feed system coupled to the liquid jet processing head to provide an abrasive to the liquid jet;

operating the ultra-high pressure liquid jet system according to a step of selectively mixing an abrasive to the liquid jet to at least 20,000 psi during a rail cutting operation or a re-profiling operation and translating the liquid jet processing head relative to the rail, thereby performing a processing operation on a linear length of the rail along a direction of translation of the rail.

* * * * *